United States Patent [19]

Moody

[11] 3,724,600

[45] Apr. 3, 1973

[54] SUBMARINE OUTBOARD GREASING SYSTEM

[75] Inventor: Paul E. Moody, Barrington, R.I.

[73] Assignee: The United States of America as represented by the Secretary of the Navy

[22] Filed: July 29, 1971

[21] Appl. No.: 167,394

[52] U.S. Cl. ............................................. 184/7 D
[51] Int. Cl. ............................................... F16n 7/10
[58] Field of Search ....................... 184/7 E, 7 F, 7 R

[56] References Cited

UNITED STATES PATENTS

| 3,497,035 | 2/1970 | Straitwell, Jr. | 184/7 E |
| 3,330,380 | 7/1967 | Fujita | 184/7 F |

FOREIGN PATENTS OR APPLICATIONS

| 867,584 | 5/1961 | Great Britain | 184/7 F |
| 787,478 | 12/1957 | Great Britain | 184/7 F |
| 774,940 | 5/1957 | Great Britain | 184/7 F |
| 1,022,059 | 1/1958 | Germany | 184/7 F |

Primary Examiner—Manuel A. Antonakas
Attorney—R. S. Sciascia et al.

[57] ABSTRACT

A greasing system comprised of two major grease supply lines and a series of individual floating valve and piston units connected in parallel, between the supply lines, is provided. Two supply lines penetrate the ship's hull, with both a grease source and a pressurizing means located inside the ship. The system is arranged so that when one supply line is pressurized, the other is open to permit discharge of excess grease. Individual grease fittings are connected in pairs to each floating valve and piston unit. The floating valve alternately opens passages to opposite sides of the floating piston and each floating piston forces a measured amount of grease to alternate fittings through other passages in the floating valve.

2 Claims, 3 Drawing Figures

SUBMARINE OUTBOARD GREASING SYSTEM

This invention concerns greasing systems for greasing multiple fittings and, more particularly, a submarine greasing system for greasing outboard fittings from a grease supply source inside the submarine.

In a situation such as the greasing of a multiple number of fittings wherein the source of grease is isolated from the fittings to be greased, e. g., the outboard fittings of a submarine, it has been the practice to accomplish the greasing by first making a fairly large opening in the hull to accommodate a master grease supply line and then connecting to this supply line a multiple number of high pressure grease piping and pipe hangers which are selectively located to reach the fittings that are desired to be greased. Individual greasing is accomplished by a system which utilizes a large grease manifold attached to and penetrating the ship's pressure hull. Where forty outboard fittings are to be greased, the manifold is complemented by an indexing arm which is adapted to be turned to forty different positions. In each position, grease may be pumped into a master fitting and from there is directed through an individual grease line to one of the grease fittings. A chart maintained by the operator provides a record of which position of the indexing arm corresponded to a particular grease fitting. A complex system such as this requires that grease travel down one of 40 grease lines to the 40 grease fittings. Such a system further requires, among other components, a complex manifold, a 40-position indexing arm, a large hull penetration and a maze of high pressure grease piping and pipe hangers. These and other undesirable features are avoided by the present invention.

The present invention provides a method of and means for greasing outboard fittings on submarines which requires only a small hull insert with two small hull penetrations, a floating valve having hydraulic actuators at each end and a floating piston which is selectively connected to the floating valve housing. The floating piston is received in a cylinder of such dimensions that the amount of grease desired to be applied to each fitting is that amount which is contained in the cylinder between the two opposed positions of the floating piston. In the submarine, one line leading through the hull is open and the other is pressurized and connected to a grease supply source. Grease under pressure is forced through one-half of the hydraulic actuators in parallel, activating each actuator and positioning its associated floating valve so that the grease itself provides the force necessary to drive the floating piston from a position at one end of its cylinder to a position at the opposite end of the cylinder. The grease contained in the cylinder then is forced through ports and passages about the floating valve and out to a particular fitting.

Each set of grease fittings in a submarine, industrial plant, etc., thus can be connected in advance to the system with one-half of the fittings greased through one set of ports when the floating piston is forced in one direction and the second half of the fittings greased through an alternate set of ports when the floating piston is forced in the opposite direction. More than two sets of fittings may be greased by selectively increasing the number of floating valve/piston assemblies.

Accordingly, it is an object of the present invention to provide a simple, low cost, safe and accurate means of and method for greasing outboard grease fittings on vessels such as submarine.

Another object of the present invention is to provide an outboard greasing system having an individual measured source of grease for each fitting so that the amount of grease supplied to each fitting is positively ascertained without further measurement.

A further object of the invention is to provide an outboard greasing system in which grease-distributing valves are positioned so as to greatly reduce the number of flow lines required.

Other objects, advantages and novel features of the invention will become apparent from the following detailed description thereof when considered in conjunction with the accompanying drawings in which like numerals represent like parts throughout and wherein.

Figure 1:
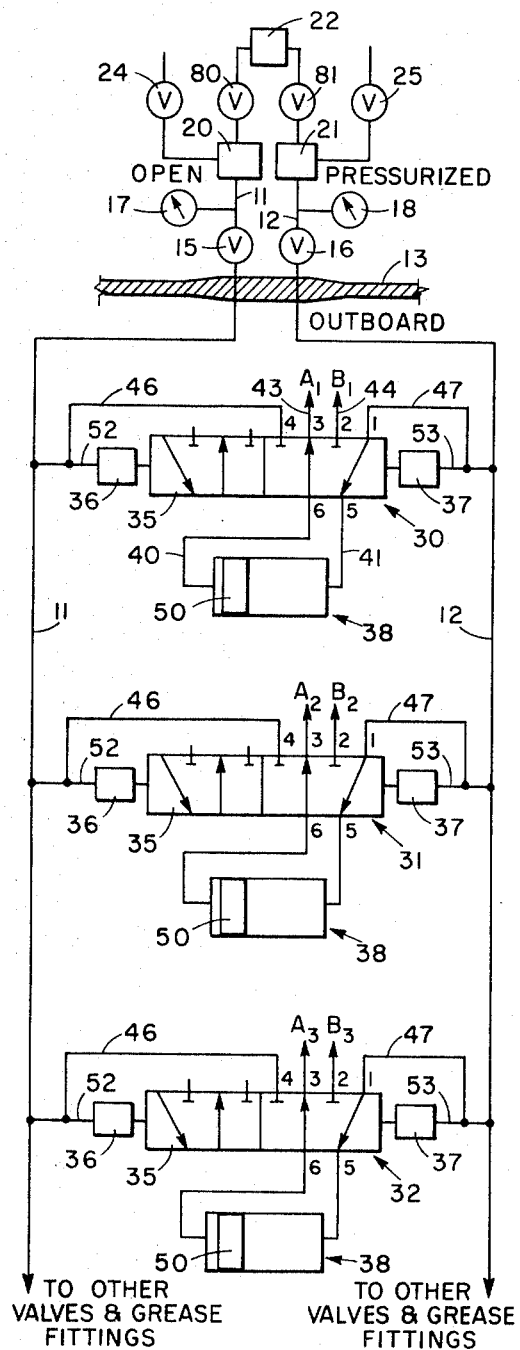
FIG. 1 is a schematic diagram of the greasing system of the present invention in condition to apply grease to one-half of the required fittings.
Figure 2:
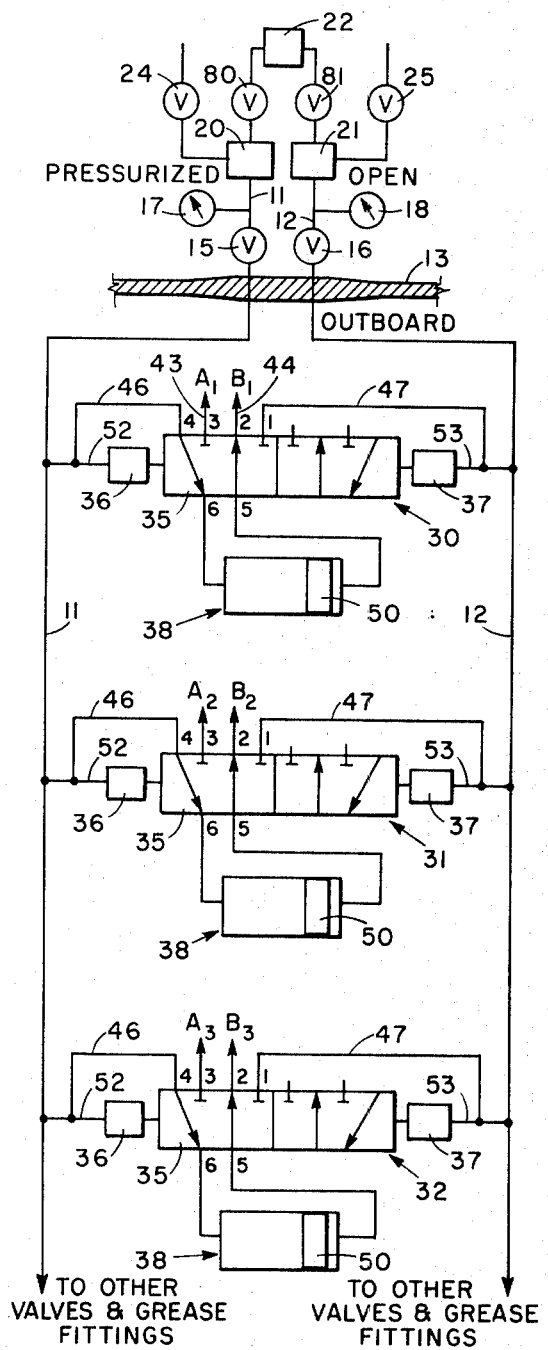
FIG. 2 is a schematic diagram of the greasing system of FIG. 1 in the alternate condition to that shown in FIG. 1.

Referring to FIGS. 1 and 2, the greasing system is shown with flow lines 11 and 12 extending through the pressurized hull 13 of a submarine. On the inboard side of hull 13 are positioned a pair of shut-off valves 15 and 16, a pair of pressure gauges 17 and 18 and a pair of tanks containing a supply of grease 20 and 21. Each tank is connected to a pressure source 22 and each tank is vented as indicated at 24 and 25 to provide selective pressurized conditions in one flow line and open conditions in the other line. Connected in parallel across each of the flow lines are a series of supply units 30, 31, 32, etc., as necessary to connect to all of the fittings requiring greasing. Each individual unit 30–32 includes a multiple outlet chamber 35 containing a floating valve, shown in FIG. 3, a pair of hydraulic actuators 36 and 37, a floating piston cylinder or chamber 38 having connecting lines 40 and 41 for connection to the chamber 35 and a pair of outlet lines 43 and 44 for connection to individual fittings to be greased. Each hydraulic actuator is bypassed by feed lines 46 and 47, respectively, whose function will be explained in connection with the description of FIG. 3. In each supply unit or means 30–32, floating piston chamber 38 contains a floating piston 50 which due to the stage of operation is, in FIG. 1, in the extreme left position in cylinder 38. In FIG. 2, piston 50 is seen in the opposite position in cylinder 38 to the position shown in FIG. 1, the piston having been displaced from its position in FIG. 1 by a measured volume of grease admitted into the chamber through line 40. Each distribution chamber 35 is provided with preferably six ports numbered as indicated and interconnected in the manner shown in detail in FIG. 3.

Figure 3:
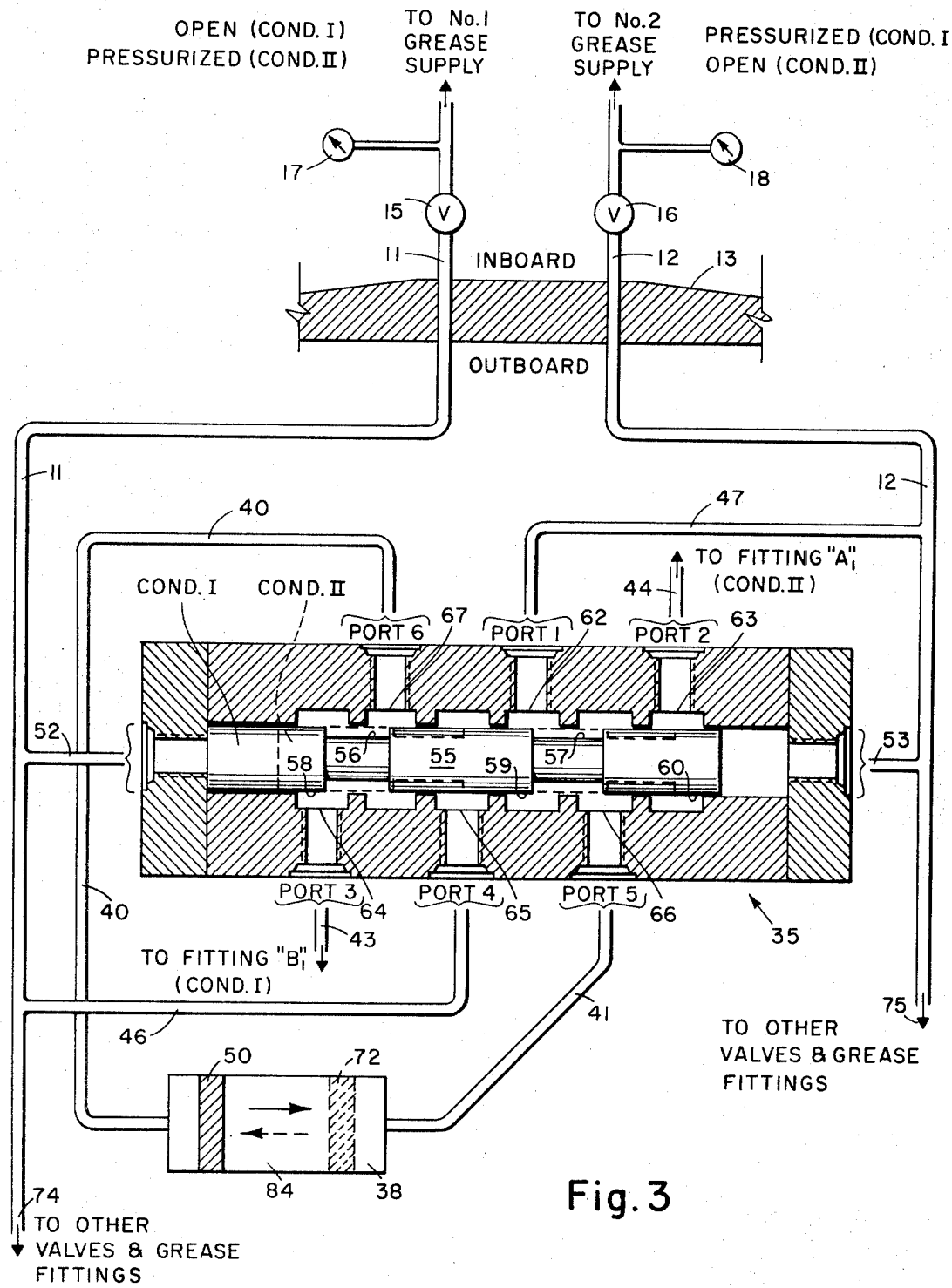
FIG. 3 is an illustration partly in schematic and partly in plane view of the operative components of the embodiment shown in FIGS. 1 and 2.

In FIG. 3, chamber 35 is shown connected across supply lines 11 and 12 by parallel feed lines 46 and 52 with respect to supply lines 11 and 47 and 53 with respect to supply line 12. Chamber 35 preferably is provided with a sliding valve 55 having annular recesses 56 and 57 interspersed between sections of full diameter 58–60. Chamber 35 is provided with six ports, numbered 1 through 6, each port communicating with respective annular grooves 62–67. These grooves are separated by annular rings 70, with the clearance between the outer diameter of floating piston 55 and the interior wall of chamber 35 being extremely fine so as to preclude the movement of any significant amount of grease from one groove to the adjacent groove. Floating piston 50 in cylinder 38 is shown in the position assumed after supply line 12 has been pressurized and the grease contained between piston 50 in the position shown in FIGS. 1 and 3 and in its alternate position shown in phantom at 72 has been forced out through line 40. Grease supply lines 11 and 12 are extended to any length desired as indicated by arrows 74 and 75, depending upon the number of fittings to be greased and have connected between them a plurality of distribution chambers 35 identical or substantially identical to that shown and having identical or substantially identical connecting parts so that all floating valves 55 may act in unison or at least sequentially, depending upon the time it takes for grease under pressure to each each valve in succession and actuate that valve.

In operation, the system is first pressurized in one line, for example, 11, with the grease continued to be pumped into the line until it comes out line 12 beyond an opened valve 25. This is the condition shown in FIG. 2 with valve 80 open and valve 81 closed and also with valve 24 closed. Next, valves 25 and 80 are closed and valves 24 and 81 opened so that pressurized grease from supply source 21 may be forced, by pressure from pressure source 22, through line 12 to lines 53 and 47 into supply means 30. Grease entering through line 47 is initially blocked by valve section 59, but grease under pressure entering through line 53 encounters the end of floating valve 55 which at that time is adjacent to the end of chamber 35 at line 53. The pressurized grease forces floating valve 55 to the left until it is stopped by the opposite end of chamber 35 as shown in FIG. 3. In the process, valve 55 opens a passage from line 47 and port 1 through groove 62 and recess 57 to port 5. Grease then flows out port 5 and through line 41 until it encounters floating piston 50 which at that time was in the position shown in phantom at 72. The grease in line 41 forces floating piston 50 to the left to the position shown in FIG. 3, partially filling the system with grease.

The foregoing procedure is repeated until all ports, grooves, passages and lines are filled with grease. At this time, the system is ready for use in forcing grease into submarine outboard or other fittings through lines 43 and 44. Fittings, $A_1$, $A_2$, $A_3$, etc., may now be greased simultaneously by opening valve 25 and forcing additional grease under selected pressure into line 11. Each "A" fitting will receive the precise amount of grease which is contained in volume 84. Next, fittings, $B_1$, $B_2$, $B_3$, etc., may be greased by closing valve 25, opening valve 24 and forcing additional grease into line 12.

More specifically, the system is prepared for use by pumping grease into line 11 until the pressure on gauge 17 holds at 3,000 psi. Grease which comes out of line 12 is captured and is equal to the sum of the grease used to actuate the several slidable valves 35 that are connected in parallel between lines 11 and 12. Following this procedure, grease is pumped into line 12 until a pressure of 3,000 psi on gauge 18 is established and grease that comes out of line 11 is captured as in the foregoing operation. The grease coming out of line 11 is now equal to the sum of the grease used to actuate the slidable valves and pistons from the position 72 in FIG. 3 to the original position indicated by the numeral 50.

It will be appreciated that the present invention presents a unique and advantageous system for greasing submarine fittings wherein one small hull insert with two penetrations is all that is required to provide grease for distribution to 40 or more outboard fittings. Greasing the outboard components is much simpler because the bulky, cumbersome manifold is eliminated and much easier identification of and checking off of fittings that have been greased is afforded. Moments only are required to grease one-half of the outboard fittings after the system has been filled and connected to all "A" and "B" fittings. The remaining outboard fittings then are greased by interchanging the pressurized and open lines. The present system also requires less space inside the hull than existing systems, and the cost of each system if mass-produced would be appreciably less than the cost of a like number of existing manifold-type systems. Additional grease fittings can be added to the system by simply extending lines 11 and 12 and introducing more parallel, slidable valves and floating pistons therebetween. These valves and piston assemblies are located or can be located as close to the fittings to be greased as desired, thereby greatly reducing the number of long grease supply lines required where a manifold is used.

Obviously, many modifications and variations of the present invention are possible in the light of the above teachings. For example, the size of the floating pistons can be varied to meet individual requirements of the mechanism being greased. Also, the function of the piston can be incorporated into the valve to further simplify the system, and an electric switch may be added which would be activated at each end of a piston or valve stroke, providing a positive indication that a measured volume of grease has been supplied.

What is claimed is:

1. A portable lubricating system for an industrial plant, a submarine or other vessel having installed therein at least a pair of lubricant supply tanks, a pressure source for alternately pressurizing and venting the supply tanks, vents, gauges and shut-offs for controlling the dispersing of lubricant from the tanks, and outboard lubricant hull fittings comprising:

at least a pair of feed lines connected to said shut-off valves and said tanks,
  said feed lines penetrating the hull of the vessel and extending therebeyond to the vicinity of said fittings;
a plurality of chambers connected in parallel across said feed lines adjacent to at least pairs of said fittings, said chambers having outlet lines connected thereto for supplying lubricant alternately to at least two outboard fittings for each chamber;
an hydraulic actuator interposed between each of said feed lines and the adjacent end of said chambers, said chambers each containing a floating piston having a plurality of piston sections and sections of lesser diameter interconnecting the piston sections;

said chambers further including a plurality of annular grooves of greater diameter than the diameter of said pistons, and a plurality of ports communicating with alternate ones of said grooves; and a metering piston connected across two of said ports, said piston sections, said ports and said annular grooves so arranged that when said floating piston is at one end of its travel lubricant will be forced through one of said ports, the annular groove communicating therewith, an adjacent annular groove, and another of said ports to one end of said metering valve;

said metering valve, when actuated by said lubricant flow, forcing lubricant out through others of said annular grooves and said ports alternately to at least two hull fittings for each of said chambers, said system and all elements thereof operated solely by alternately pressurizing and venting said lubricant supply tanks.

2. The lubricating system as defined in claim 1 wherein said chambers and said floating pistons are arranged in relation to said annular grooves and ports so that when one of said feed lines is pressurized lubricant will flow through respective chambers to respective metering valves, displacing said metering valves and forcing the lubricant occupying the metering valve cylinders through said chambers and said outlet lines to at least one fitting per chamber, said floating pistons actuated by a lesser pressure on the interior end of said piston sections being overcome by a greater pressure on the outer end of an end piston, which greater pressure is exerted through the adjacent hydraulic actuator such that said piston is displaced axially to the opposite end of its travel, thereby opening ports to the alternate fittings and closing ports to the opposite end of said metering cylinder, whereby a self-regulating lubricating system is provided which permits the use of a plurality of individual chambers for supplying lubricant alternately to at least a pair of hull fittings for each chamber.

* * * * *